May 8, 1923.  
H. R. KNAACK  
CASTER  
Filed March 31, 1921
1,454,119
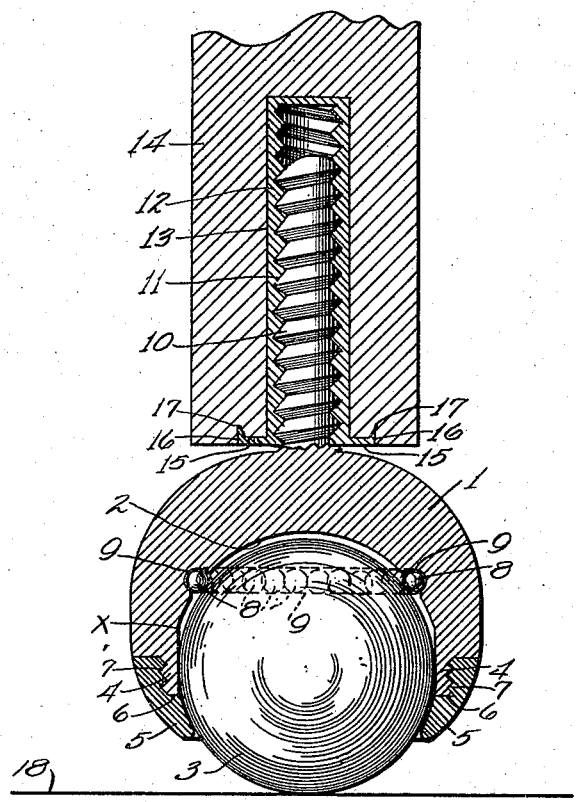
INVENTOR  
H. R. Knaack  
BY  
ATTORNEYS Patented May 8, 1923.

UNITED STATES PATENT OFFICE.

HERMANN R. KNAACK, OF CHICAGO, ILLINOIS.

CASTER.

Application filed March 31, 1921. Serial No. 457,388.

*To all whom it may concern:*

Be it known that I, HERMANN R. KNAACK, a citizen of the Republic of Germany, and a resident of Chicago, in the county of Cook and State of Illinois, have invented a new and useful Improvement in Casters, of which the following is a full, clear, and exact description.

My invention relates to casters, and it consists in the constructions, combinations and arrangements herein described and claimed.

An object of my invention is to provide a caster that is applicable to various articles of furniture, trucks, and the like, and has means for holding a ball member so that the latter has a rolling contact with the floor or other surface.

A further object of my invention is to provide a device of the character described that has means for holding a ball member in operative engagement with a floor and for preventing friction between the relatively movable parts thereof so that the article to which the device is applied can be moved readily in any direction.

A further object of my invention is to provide a device of the character described that is simple in construction, not likely to get out of order easily, and thoroughly practical commercially.

Other objects and advantages will appear in the following specification, and the novel features of the invention will be particularly pointed out in the appended claim.

My invention is illustrated in the accompanying drawings, forming part of this application, in which The figure is a vertical section, showing the device operatively applied.

In carrying out my invention, I provide a body portion 1 which is formed of any suitable material, such as metal. The body portion is preferably substantially hemispherical in shape, as shown, and is formed with a socket 2 adapted to receive a ball member which protrudes beyond the edge thereof. The wall of the socket 2 is fashioned to conform with the ball member 3 to the annular line indicated at *x* and is formed to extend tangent to the ball member 3 from that line to the edge of the socket so that the ball member 3 will have a rolling contact with the wall of the socket adjacent the edge of the latter.

The body portion 1 or holder for the ball member 3 is formed with a reduced exteriorly threaded annular extension 4 and a retaining member 5, having the shape of a segment of a hollow sphere formed with its inner wall offset at 6 and threaded at 7, is adapted to engage with the threaded extension 4 so that the inner wall thereof is spaced from the ball member 3. The latter is thus movably held between the tangential portion of the wall of the socket 2 and a plurality of relatively small ball members 8 that work in a race 9 which is formed by providing an annular groove in the wall of the socket 2.

The body portion 1 has an integral stem or shank 10, the axis of which, if extended, would intersect the center of a ball member held within the body portion 1 in the manner described. The stem or shank 10 is threaded exteriorly at 11 for engagement with an interiorly threaded tubular socket 12 that is disposed in a recess 13 in a portion 14 of an article of furniture or the like to which the device is applied. In the present instance, the portion 14 is the leg or support of the article of furniture, but obviously the device may be applied to other portions of an article and to articles of other types and characteristics, as for instance to trucks. The socket 12 has a laterally extending flange 15 adapted to an enlargement 16 of the recess 13. When the socket 12 is disposed in the opening 13 with the flange 15 in the enlargement 16, tangs 17 formed integrally with the flange at the outer edge thereof will be imbedded in the end of the leg 14 to maintain the socket 13 in position.

From the foregoing description of the various parts of the device, the operation thereof may be readily understood. The device is simple in construction and comprises but few parts. At the same time, it is thoroughly effective for the purpose intended. The articles to which the device is applied may be moved easily in any direction since the caster is always in position relative to the article supported to move in any direction. Since a rolling contact is had by the ball member 3 with a floor 18 or the like, the latter will not be marked or marred when the articles supported by the caster is moved thereover.

It will of course be understood that the number of casters required will be applied to each article. In assembling the device, the balls 8 are placed in the race 9 when the body portion 1 is held in inverted position. The ball member 3 is then placed in the socket 2 and the retaining member 5 is then adjusted in the manner described. When the stem or shank 10 is screwed into the threaded tubular socket 12, which has been secured in the recess 13, the device is ready for service. It is obvious that the device will work without friction.

I claim:

The combination with an interiorly threaded tubular socket having a smooth outer surface, a flange at its open end, and inwardly extending prongs adapted to be embedded in the leg of an article, of a ball carrying member having a threaded shank adapted to be removably received in said tubular member, said member having a cylindrical recess with a spherical end, a ball of the same diameter as the diameter of the cylindrical portion of said recess being rotatably disposed in said recess, said recess being formed with an annular ball receiving groove in its spherical-shaped end, said groove being semi-spherical in cross section and being disposed substantially midway between the bottom and the top of said recess, a plurality of small ball bearings carried by said groove and being adapted to prevent said ball from moving inwardly or laterally with respect to said recess, and a ball retaining ring threaded onto said ball carrying member and having a spherical-shaped opening of the same diameter as said ball.

HERMANN R. KNAACK.